(12) United States Patent
Reber et al.

(10) Patent No.: US 10,894,479 B2
(45) Date of Patent: Jan. 19, 2021

(54) FAST CHARGING STATION WITH CHARGING CABLE AND TEMPERATURE CONTROL DEVICE FOR THE CHARGING CABLE

(71) Applicant: Dr. Ing. h.c. F. Porsche Aktiengesellschaft, Stuttgart (DE)

(72) Inventors: Volker Reber, Michelbach an der Bilz (DE); Stefan Götz, Forstern (DE); Jari Rönfanz, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 138 days.

(21) Appl. No.: 16/217,672

(22) Filed: Dec. 12, 2018

(65) Prior Publication Data
US 2019/0217728 A1    Jul. 18, 2019

(30) Foreign Application Priority Data
Jan. 15, 2018  (DE) .................. 10 2018 100 732

(51) Int. Cl.
*B60L 53/16*   (2019.01)
*H01R 13/00*   (2006.01)
*B60K 6/20*    (2007.10)

(52) U.S. Cl.
CPC ............ *B60L 53/16* (2019.02); *H01R 13/005* (2013.01); *B60K 6/20* (2013.01); *B60Y 2200/91* (2013.01); *B60Y 2200/92* (2013.01); *B60Y 2300/91* (2013.01)

(58) Field of Classification Search
CPC ........ B60L 53/16; B60L 53/11; B60L 53/302; B60L 2240/36; B60L 53/18; B60K 6/20; B60S 5/00; B60Y 2200/91; B60Y 2200/92; B60Y 2300/91; H02J 7/0036; H01B 7/425; H01R 13/005
See application file for complete search history.

(56) References Cited

U.S. PATENT DOCUMENTS

| | | | |
|---|---|---|---|
| 6,396,241 B1 * | 5/2002 | Ramos .................... | B60L 53/34 320/108 |
| 9,296,311 B2 * | 3/2016 | Kawase ............. | B60L 11/1883 |
| 9,321,364 B1 | 4/2016 | Ashworth et al. | |

(Continued)

FOREIGN PATENT DOCUMENTS

| | | | | |
|---|---|---|---|---|
| DE | 102011119495 A1 | 5/2013 | | |
| DE | 102013217191 A1 * | 3/2015 | ............ | B60L 53/665 |

*Primary Examiner* — Helen Rossoshek
(74) *Attorney, Agent, or Firm* — RatnerPrestia

(57) ABSTRACT

A charging cable device for a fast charging station for fast charging a battery of a vehicle with an electric drive, having a temperature control device, and a charging cable connected thereto. The charging cable has a multiplicity of fluid lines which extend from an end of the charging cable facing the temperature control device to an end facing away from the temperature control device, and are connected to one another at the end facing away from the temperature control device. The temperature control device is connected to the fluid lines of the charging cable to form a fluid circuit. The temperature control device is designed to heat a fluid in the fluid circuit. Also disclosed is a fast charging station for fast charging a battery of a vehicle with an electric drive. The fast charging station has a charging cable device at the top.

10 Claims, 7 Drawing Sheets

(56) References Cited

U.S. PATENT DOCUMENTS

| | | | |
|---|---|---|---|
| 10,202,046 B2* | 2/2019 | Kohler | B60L 53/302 |
| 10,449,871 B1* | 10/2019 | Lyon | B60L 53/18 |
| 10,688,873 B2* | 6/2020 | Gotz | B60L 53/302 |
| 2005/0178632 A1* | 8/2005 | Ross | B60L 53/305 |
| | | | 191/10 |
| 2009/0256523 A1* | 10/2009 | Taguchi | B60L 53/60 |
| | | | 320/109 |
| 2011/0199047 A1 | 8/2011 | Fujii | |
| 2013/0029193 A1* | 1/2013 | Dyer | H01M 10/625 |
| | | | 429/62 |
| 2014/0292260 A1* | 10/2014 | Dyer | B60L 53/11 |
| | | | 320/107 |
| 2015/0115889 A1 | 4/2015 | Rill et al. | |
| 2015/0217654 A1 | 8/2015 | Woo | |
| 2016/0052421 A1* | 2/2016 | Galamb | B60L 53/30 |
| | | | 165/47 |
| 2016/0270257 A1* | 9/2016 | Mark | H05K 7/20245 |
| 2017/0096073 A1 | 4/2017 | Mardall et al. | |
| 2017/0232865 A1* | 8/2017 | Christen | F28D 7/0016 |
| | | | 429/120 |
| 2017/0338006 A1* | 11/2017 | Gontarz | B60L 53/302 |
| 2018/0041053 A1* | 2/2018 | Capizzo | A63H 17/44 |
| 2018/0257501 A1* | 9/2018 | Hahre | B60L 53/60 |
| 2018/0264957 A1* | 9/2018 | Fuehrer | B60L 53/18 |
| 2018/0334049 A1* | 11/2018 | Gotz | H02J 7/0042 |
| 2018/0370374 A1* | 12/2018 | Gotz | B60L 53/14 |
| 2019/0016220 A1* | 1/2019 | Kohler | B60L 53/18 |
| 2019/0074620 A1* | 3/2019 | Moseke | B60L 53/18 |
| 2019/0255961 A1* | 8/2019 | Heyne | B60L 53/14 |
| 2019/0326762 A1* | 10/2019 | Zoon | B60L 53/14 |
| 2019/0385765 A1* | 12/2019 | Lyon | H01B 7/423 |

* cited by examiner

FAST CHARGING STATION WITH CHARGING CABLE AND TEMPERATURE CONTROL DEVICE FOR THE CHARGING CABLE

CROSS-REFERENCE TO RELATED APPLICATION

This application claims priority to German Patent Application No. DE 10 2018 100 732.9, filed Jan. 15, 2018, which is incorporated by reference herein in its entirety.

FIELD OF THE INVENTION

The present invention relates to a charging cable device fora fast charging station for fast charging a battery of a vehicle with an electric drive, having a temperature control device, and a charging cable connected thereto, wherein the charging cable has a multiplicity of fluid lines which extend from an end of the charging cable facing the temperature control device to an end facing away from the temperature control device, and are connected to one another at the end facing away from the temperature control device, the temperature control device is connected to the fluid lines of the charging cable to form a fluid circuit.

The present invention also relates to a fast charging station for fast charging a battery of a vehicle with an electric drive, wherein the fast charging station has a charging cable device at the top.

BACKGROUND OF THE INVENTION

Vehicles with an electric drive usually comprise a drive battery which makes available electrical energy for driving the vehicle. The vehicle can be an exclusively electrically operated vehicle or what is referred to as a hybrid vehicle which, in addition to the electric drive, additionally has a further, conventional drive, typically an internal combustion engine. The drive battery is also referred to here simply as a battery.

The drive battery usually comprises in this context a multiplicity of battery cells which are connected in series and in parallel with one another, in order to make available a suitable combination of current and voltage for the electric drive.

However, the acceptance of electrically driven vehicles is currently still low, since it takes a long time to charge the drive battery. In this context, various strategies for charging the drive battery are known.

For charging at a conventional AC voltage or three-phase socket, a vehicle typically has an on-board charging device which both carries out a required conversion from alternating current into direct current and controls the overall charging operation. The charging pillar is therefore passive in this case.

However, this AC charging mode is limited in its power owing to the available input power, which is generally limited in its power by a supply voltage of 230 V or 400 V and a supply current of at most 16 A or 32 A. As a result, the charge rate when charging in the AC charging mode is limited and in contemporary electric vehicles there can result in charging times of several hours per 100 km of range.

On account of the long charging times for AC charging, DC charging with DC voltage has been developed. In contrast to AC charging, the vehicle here does not have a separate charging device for setting and maintaining charging parameters, i.e. in particular charging current and charging voltage. Instead, the vehicle-external charging station carries out the charging process and also shapes voltage and current as is necessary and/or desired for charging the drive battery of the connected vehicle. The corresponding charging station is then responsible for maintaining charging parameters.

In the case of DC charging, a charging cable usually comprises two DC charging lines which are typically connected directly to the poles of the drive battery of the vehicle during the charging process. There is no DC isolation between the DC charging lines and the drive battery. The power levels of DC charging stations of this type are currently up to 50 kW. This is a multiple of computationally possible 12.8 kVA, such as can be theoretically achieved in the AC charging mode when charging with 400 V three-phase current at 32 A. DC charging therefore already permits significantly accelerated charging of the drive battery compared to AC charging.

Currently available vehicles have a drive battery with an overall capacity of often 30-60 kWh, in some cases up to 100 kWh and more. Therefore, even with current DC charging technology, computational charging times for complete charging of the drive battery turn out to be at least one to two hours. Owing to actual limitations when charging the drive battery, the charging times can be even longer in practice. For example, before complete charging is achieved, current batteries are often no longer charged with the maximum charging current in order to increase the service life of the battery and to avoid damage.

At present, improved DC fast charging stations are being developed which have, for example, a maximum power of up to 300 kW in order to achieve or even to exceed charge rates of more than 20 km/min. This power level can be achieved by using, for example, charging voltages of up to 1000 V, in order to appropriately limit necessary charging currents, in this case to 300 A, for example. In this way the recharging of the drive battery, for example while traveling, is to be changed to orders of magnitude which customers are accustomed to from refueling their previous vehicles with internal combustion engines. Exemplary details regarding DC charging and the corresponding processes in the charging system and in the vehicle are described, inter alia, in DIN EN 61851.

Corresponding fast charging stations therefore require high charging currents, requiring correspondingly large copper cross sections of the DC charging lines in the charging cable in order to keep line losses low. In addition, owing to the weather, effects of light and the high DC voltage used, a correspondingly thick and robust cable sheath as well as a sufficiently thick insulation are necessary in the interior of the charging cables. In total, the diameters of typical charging cables already often exceed 30 mm nowadays, with even larger cable cross sections to be expected in the future. This makes the charging cables significantly more difficult to handle, already owing to a weight of the conductors, which are typically fabricated from copper or aluminum, as well as to a weight of the insulation and of the cable sheath. The materials which are used for the conductor and for the insulation, which are usually fabricated from plastics such as, for example, polyurethane, also have a high degree of rigidity. The high degree of rigidity reinforces the effect of the large weight of the cable in that the charging cable and therefore the charging plug are very difficult to move and, in particular, very difficult to rotate. Moreover, the weight of the cable is often not directed perpendicularly with respect to the ground but rather a large lever effect can arise as a result of the high degree of rigidity of the charging cable. Therefore, it can be difficult to move the charging cable with the charging plug from the fast charging station to the vehicle which is to be charged, to orient the charging plug nicely with a charging socket of the vehicle and finally to connect the charging plug to the charging socket. In this context, rapid fatigue or exhaustion can occur, which can adversely affect the acceptance of electric vehicles.

Although highly flexible charging cable with finely filamented copper conductors and soft insulation materials and sheath materials are known, made, for example, from soft PVC (PVC-P) or preferably from silicone-based materials. These materials are, however, expensive and generally very susceptible to mechanical damage and environmental influences.

In this context, US 2015/0115889 A1, which is incorporated by reference herein, discloses an electric connecting arrangement for a charging system, in particular for charging a vehicle battery of a motor vehicle. The connecting arrangement comprises a first connecting element which can be connected to a charging station and which can enter into electrical charging contact with a second connecting element which is mounted on a mobile platform. In this context, at least one heating element is integrated into the first connecting element and/or into the second connecting element.

Moreover, DE 10 2011 119 495 A1, which is incorporated by reference herein, discloses a charging cable for charging a motor-vehicle-side energy storage unit for electrical energy. The charging cable comprises at least one connecting element for connecting to a motor-vehicle-side connection of the energy storage unit or for connecting a connection to an external energy source which is designed to make available electrical energy, wherein an electric heating device is provided for heating the connecting element and at least one section of the charging cable.

Furthermore, US 2011/0199047 A1, which is incorporated by reference herein, discloses a charging device and a charging system. The charging device contains a charging cable and a charging plug. A heater is configured in such a way that it heats the charging plug with electrical current which is made available by the charging cable. A state-determining device is designed to ascertain a state of charge of a battery mounted in the vehicle and to determine whether a heating condition for heating the charging plug is satisfied. A heating controller is configured to control heating by the heater on the basis of a determination by the state-determining device. The heater is able to be switched to a post-charging heating state in which the heating device heats the charging plug after the ending of the charging of the battery mounted in the vehicle. The heating controller switches the heater into the post-charging heating state and controls the heating which is carried out by the heater if the state-determining device determines that the charging process of the battery mounted in the vehicle is ended, and furthermore determines that a heating condition is satisfied.

Document U.S. Pat. No. 9,321,364 B1, which is incorporated by reference herein, also discloses an electric bus which can have a charging interface which is positioned on an external surface of the electric bus. One or more heating cushions can be mounted in a removable fashion on the charging interface and be configured to heat the charging interface. The heating cushions can comprise a rigid plate which forms an exposed surface of the charging interface. The plate can be positioned in such a way that a first side of the plate forms a charging head contact face when the charging head engages with the charging interface. A heating device can be mounted on a second side of the plate opposite the first side. The heating device can comprise a heating element which is configured to heat the plate by resistance heating.

Taking the specified prior art above as a starting point, described herein is a charging cable device for a fast charging station for fast charging a battery of a vehicle with an electric drive, and a fast charging station with such a charging cable device, which permit easy handling of the charging cable for charging the vehicle.

SUMMARY OF THE INVENTION

According to aspects of the invention, a charging cable device for a fast charging station for fast charging a battery of a vehicle with an electric drive is therefore specified, having a temperature control device, and a charging cable connected thereto, wherein the charging cable has a multiplicity of fluid lines which extend from an end of the charging cable facing the temperature control device to an end facing away from the temperature control device, and are connected to one another at the end facing away from the temperature control device, the temperature control device is connected to the fluid lines of the charging cable to form a fluid circuit, wherein the temperature control device is designed to heat a fluid in the fluid circuit.

According to aspects of the invention, a fast charging station for fast charging a battery of a vehicle with an electric drive is also specified, wherein the fast charging station has a charging cable device at the top.

The charging station described herein offers an improvement to the handling of the charging cable by virtue of the fact that the charging cable is heated before use. The heating reduces the rigidity of a conductor material, which is usually copper or aluminum, of an insulation layer of the conductors of the charging cable and/or of the charging cable sheath. As a result, flexibility of the charging cable can overall be improved in order to improve its handling at the start of the charging process, i.e. before or during removal of the charging cable from a holder in the charging station, in order to permit a pleasant plugging process for the user. In this context, the property, in particular of plastics which are typical for charging, cable, sheaths, for example polypropylene, polyvinyl chloride, polyurethane, polyamide or tetrafluoroethylene/Teflon, but also of copper cables, is used that they become more flexible as the temperature increases and have a relatively low rigidity. However, the rigidity of typical materials for charging lines of the charging cable is also reduced. This is achieved by making available a fluid circuit in which the fluid, as a heat transfer medium, brings about a transfer of heat from the temperature control device into the charging cable. The fluid is correspondingly heated in the temperature control device and transfers the heat to the charging cable.

The heating of the charging cable improves its handling significantly, in particular at low external temperatures to which charging cables are often subjected. This applies all the more so if the fast charging stations are installed at locations with low ambient temperatures which are, for example, below a worldwide or regional mean value.

Heating of the charging cable can be carried out with the specified charging cable device and the corresponding fast charging station, in order to heat the charging cable before use and therefore to reduce its rigidity. This comprises both connecting the charging cable to the vehicle and disconnecting the charging cable from the vehicle. The charging cable is preferably not heated during the charging process, in order to avoid increasing electrical resistance of the charging lines.

By this means, the charging cable heats up itself during the fast charging owing to the large charging currents and associated line losses themselves, so that further heating is not necessary.

The conductor material of the charging lines is usually a metal which is a good electrical conductor, for example copper or aluminum. These conductor materials also have, as metals, good thermal conductivity, so that heat is well distributed in the charging lines along the charging cable.

The fast charging station can in principle be embodied with an AC charging mode in which a supply voltage of 230 V or 400 V and a supply current of at most 16 A or 32 A can be used. The fast charging station is preferably embodied with a DC charging mode for DC charging with DC voltage. The fast charging station preferably has a power level of up to 50 kW, particularly preferably of up to 300 kW. For this purpose, a charging voltage of, for example, 1000 V and a charging current of, for example, 300 A can be set. Details on the DC charging and on corresponding processes in the fast charging station and in the vehicle are described in DIN EN 61851, which is incorporated by reference herein, for example.

The charging cable comprises at least two charging lines and a charging cable sheath as well as a sufficiently thick insulation of the at least two charging lines in the interior of the charging cable. The charging lines are manufactured, for example, from copper or aluminum, and the insulation of the charging lines, for example, from polyurethane. The charging cable sheath is manufactured from plastic, for example polypropylene, polyvinyl chloride, polyurethane, polyamide or tetrafluoroethylene/Teflon.

The vehicle with an electric drive can be an exclusively electrically operated vehicle or what is referred to as a hybrid vehicle which, in addition to the electric drive, additionally has a further, conventional drive, typically an internal combustion engine. The vehicle comprises a drive battery which is denoted below merely as a battery for the sake of simplicity. The battery typically comprises a multiplicity of battery cells which are connected in series and in parallel with one another, in order to make available a suitable combination of current and voltage for the electric drive.

In one advantageous refinement of the invention, the temperature control device has a heating device in order to heat the fluid in the fluid circuit. The heating device can be in principle any heating device. The heating device is preferably an electric heating device. The heating device preferably comprises an open-loop control device or a closed-loop control device in order to be able to carry out heating of the fluid as required. The heating of the fluid can therefore be carried out, for example, at different ambient temperatures in such a way that the charging cable is always heated to a same temperature for use. The heating device is preferably arranged in an inflow to the charging cable.

In one advantageous refinement of the invention, the temperature control device has a heat exchanger device in order to heat the fluid in the fluid circuit. The functional principle of a heat exchanger device or a heat exchanger is based on the fact that a heat transfer fluid flows into the heat exchanger device from a primary side and carries out a heat transfer to the fluid of the fluid circuit. The fluid circuit is arranged on a secondary side of the heat exchanger device. An open-loop control device or a closed-loop control device can be provided in order to be able to carry out heating of the fluid as required. For this purpose, in particular a through-flow of the heat transfer fluid on the primary side is changed. The heating of the fluid can therefore be carried out, for example, at different ambient temperatures in such a way that the charging cable is always heated to a same temperature for use. The heating device is preferably arranged in an inflow to the charging cable.

In one advantageous refinement of the invention, the temperature control device has a heat pump device in order to heat the fluid in the fluid circuit. At the heat pump, thermal energy is taken up from a reservoir at a relatively low temperature and transferred at a relatively high temperature as useful heat to a system to be heated. Heat pumps can be used both for cooling and for heating. Correspondingly, ambient heat can be fed to the fluid, or heat is extracted from the fluid which is output as ambient heat. Heat pumps are generally operated with media which evaporate at low pressure when heat is supplied to them, and which condense again after compression to a relatively high pressure which is accompanied by the outputting of heat in order to use the energy of a phase change. The pressure is selected in such a way that the temperatures of the phase change are at a sufficient distance for the transfer of heat to take place from the temperatures of the heat source and heat sink. An open-loop control device or a closed-loop control device can be provided in order to be able to carry out heating of the fluid as required. The heating of the fluid can therefore be carried out, for example, at different ambient temperatures in such a way that the charging cable is always heated to a same temperature for use. The heating device is preferably arranged in an inflow to the charging cable.

In one advantageous refinement of the invention, the temperature control device has a cooling device in order to cool the fluid in the fluid circuit. The charging cable can be cooled by the cooling device during the charging of the battery of the vehicle. Therefore, heat which is produced during the charging owing to electric line losses can be conducted away. As a result, the resistance of the charging lines is reduced. Furthermore, possible hazards as a result of excessive heating of the charging cable are prevented, for example when they are touched. A cable cross section of the charging cable can also be kept small, since the heat losses of relatively thin electrical charging lines can be compensated by cooling. This promotes a high degree of flexibility of the charging cable and permits a charging cable with a low weight to be available. The rigidity of the charging cable usually increases with its cross section.

In one advantageous refinement of the invention, the charging cable device is constructed as a closed assembly, which is pre-filled with fluid, for mounting in the fast charging station. This permits, for example, easy retrofitting of existing fast charging stations with a charging cable device for controlling the temperature of the charging cable. In the event of damage or a defect, the charging cable device can be completely replaced, so that the fast charging station is quickly ready to function again. The charging cable device can then be repaired independently of the fast charging station. The same applies, for example, to maintenance operations or testing operations on the charging cable device. In particular, laborious filling of the charging cable device with the fluid as well as an associated venting of the charging cable device can be dispensed with. When a potentially noxious or hazardous fluid is used, stresses or hazards in the region of the fast charging station can be avoided, since the fluid can be filled into the charging cable device at particularly suitable locations for the use of potentially noxious or hazardous substances.

In one advantageous refinement of the invention, the charging cable device has a pump for circulating the fluid in the fluid circuit and/or a compensation container for the fluid. By means of the pump, the fluid can be actively circulated through the fluid circuit. With the compensation container it is possible to compensate for fluctuations in volume of the fluid owing to a change in the temperature. Moreover, a loss of fluid can be compensated for, and air pockets in the fluid can be reduced.

In one advantageous refinement of the invention, the fluid lines are constructed individually in the charging cable and arranged separately or constructed together and constructed coaxially with respect to one another or in each case constructed and arranged integrally with a charging conductor, in particular in each case coaxially within a charging conductor. The fluid lines are arranged within the charging cable in principle in any desired way. The charging cable can also have more than two fluid lines, in order thereby to achieve a desired distribution of heat within the charging cable. The charging cable can also have, for example, any desired number of fluid lines to be flowed through in one direction and a number of fluid lines, independent thereof, to be flowed through in an opposing direction.

In one advantageous refinement of the invention, the fast charging station has a charging pillar housing, the charging pillar housing is embodied with a mounting holder for receiving the temperature control device, the charging pillar housing has an upper-side access opening, and the temperature control device can be lowered into the mounting holder through the upper-side access opening.

In one advantageous refinement of the invention, the fast charging station has fast connecting devices for connecting to the charging cable device. This comprises all the closures and couplings, i.e. electrical connections and fluid connections are designed for rapid mounting. As a result, the charging cable device can be mounted easily. In this context, the charging cable can be secured simply by the charging cable sheath being secured in a clamping fashion to an outlet of a housing of the charging pillar. If appropriate, the charging cable can additionally be secured in a carrying arm of the housing of the charging pillar.

Below, the invention will be explained by way of example with reference to the appended drawings on the basis of preferred exemplary embodiments, wherein the features presented below may in each case individually or in combination represent an aspect of the invention.

DETAILED DESCRIPTION OF THE INVENTION

Figure 1:
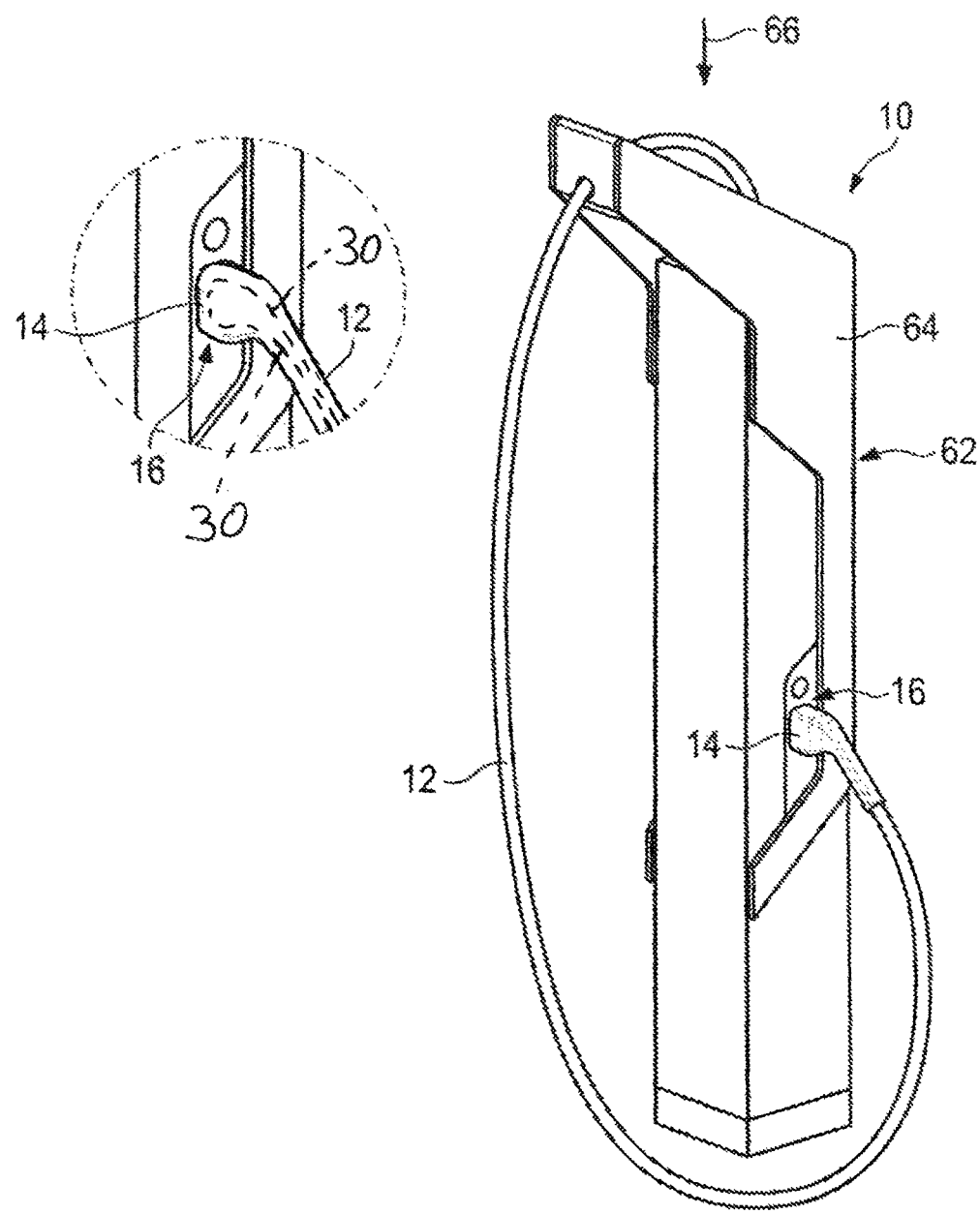
FIG. 1 shows a fast charging station for fast charging a battery of a vehicle with an electric drive according to a first, preferred embodiment, in a perspective view.
Figure 2:
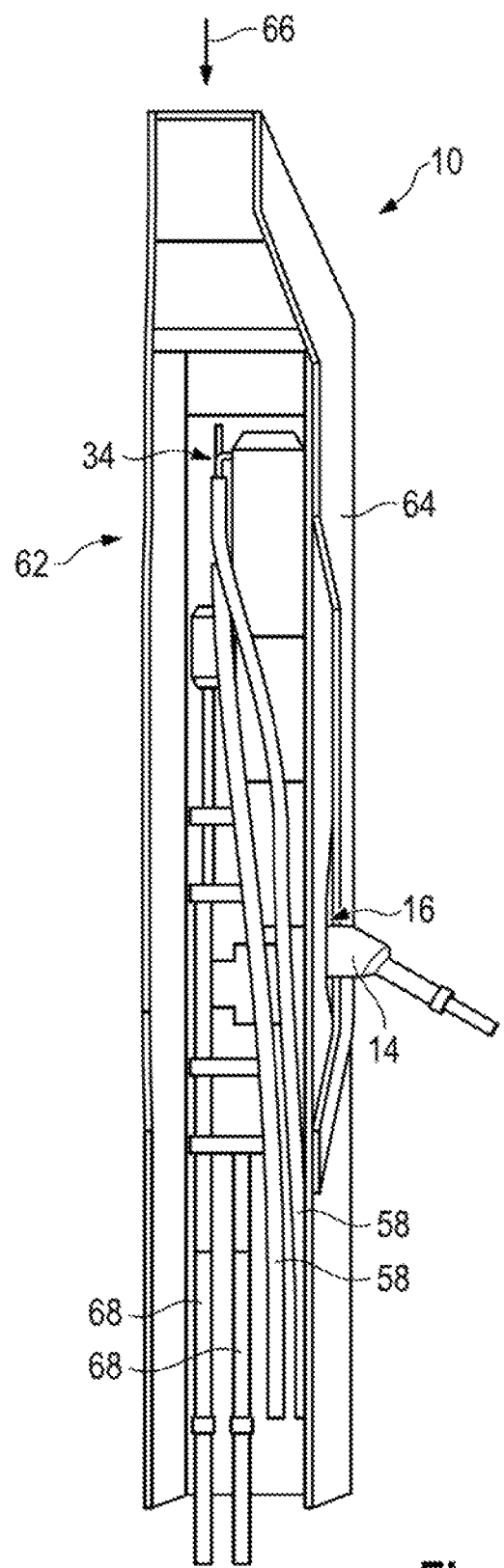
FIG. 2 shows the fast charging station from FIG. 1 in an opened state with a charging cable device according to the first embodiment, arranged therein, in a perspective view.

FIGS. 1 and 2 show a fast charging station 10 according to aspects of the invention according to a first, preferred embodiment.

The fast charging station 10 is embodied with a DC charging mode for DC charging a drive battery of a vehicle with DC voltage. The fast charging station 10 preferably has a power level of up to 50 kW. In an alternative embodiment, the fast charging station 10 has a power level of up to 300 kW. In order to permit this, the fast charging station 10 is designed for a charging voltage of up to 1000 V and a charging current of up to 300 A. Details on the DC charging and on corresponding processes in the fast charging station 10 and in the vehicle are described in DIN EN 61851, for example.

The fast charging station 10 comprises a charging cable device 50 for fast charging the drive battery, also referred to below simply as a battery, of the vehicle (not illustrated here). The vehicle is correspondingly embodied with an electric drive.

Figure 3:
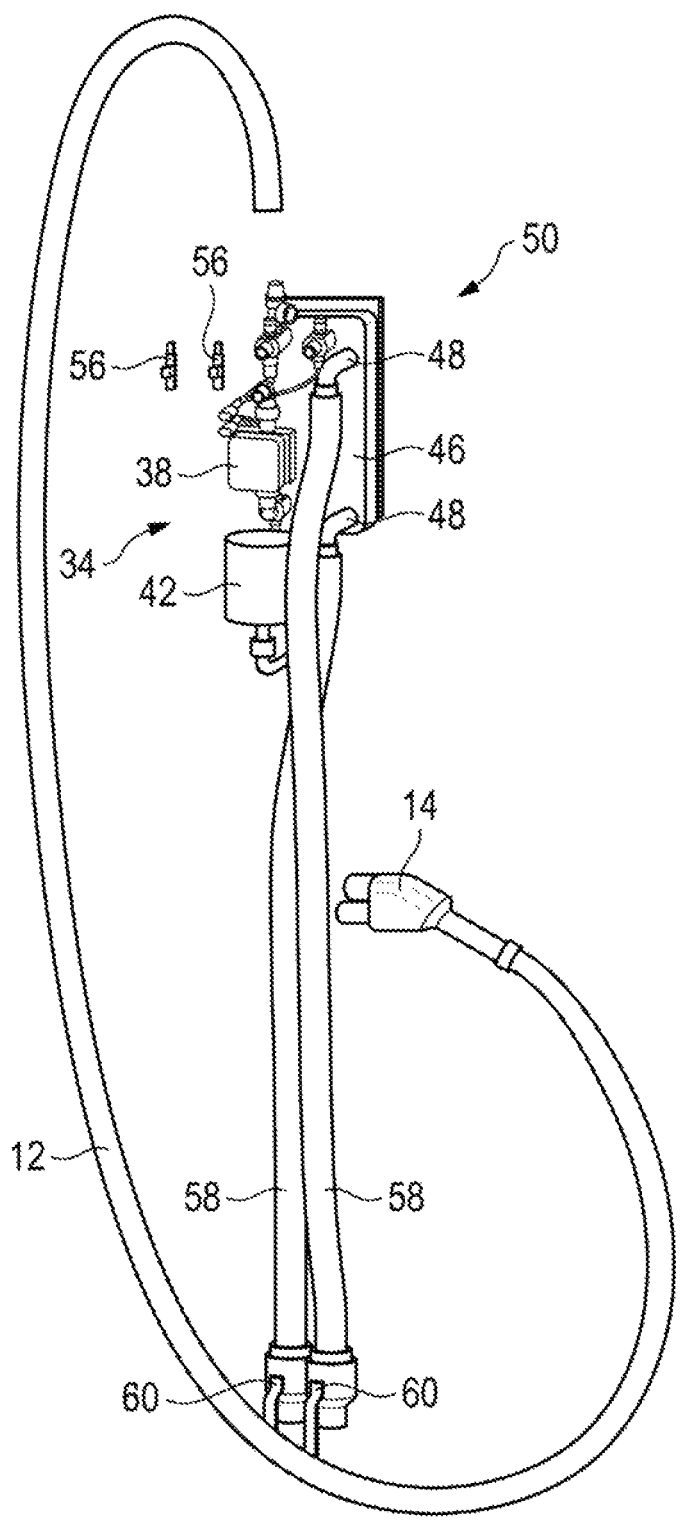
FIG. 3 shows the charging cable device of the fast charging station from FIG. 2 according to the first embodiment, in a perspective view.

The charging cable device 50 according to the first embodiment is illustrated individually in FIG. 3. The charging cable device 50 comprises a temperature control device 34 and a charging cable 12 which is connected thereto. The charging cable 12 is embodied at its end remote from the temperature control device 34 with a charging plug 14 according to the Cable Standard Combined Charging System (CCS) Combo type 2. The charging plug 14 is held, when not in use, in a holder 16 of the fast charging station 10.

Various charging cables 12 are described below with reference to FIGS. 6 to 8, which charging cables 12 can be used for example in the charging cable device 50.

Figure 6:
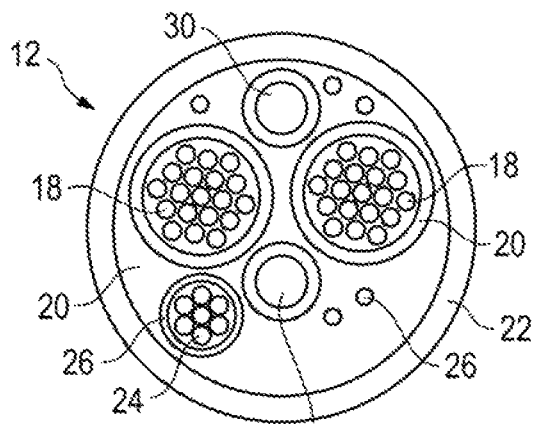
FIG. 6 shows a schematic illustration of a charging cable of the charging cable device from FIG. 3 according to a second embodiment, wherein two fluid ducts are arranged in the sheath of the charging cable, in a sectional view.

A charging cable 12 according to a second embodiment is illustrated in detail in FIG. 6. The charging cable 12 according to the second embodiment comprises two DC charging lines 18 as charging conductors with corresponding insulations 20 which are arranged in ‚a charging cable sheath 22. The DC charging lines 18 are embodied here as DC charging lines for charging with DC current and are manufactured from copper. The insulations 20 of the DC charging lines 18 are fabricated from polyurethane, and the charging cable sheath 22 is manufactured from polypropylene.

Furthermore, arranged in the charging cable sheath 22 is a ground conductor 24 which is surrounded by a corresponding ground insulation 26.

Moreover, a multiplicity of signal conductors 28 with which the vehicle can communicate with the fast charging station 10 are arranged in the charging cable sheath 22.

Moreover, two fluid lines 30, in which a fluid can circulate, are constructed in the charging cable sheath 22. The two fluid lines 30 are connected to the temperature control device 34 at an end facing said temperature control device 34. At an end of the charging cable 12 facing the charging plug 14, the two fluid lines 30 are connected to one another in order to permit circulation of the fluid from the temperature control device 34 through one of the fluid lines 30 in the direction of the charging plug 14 and through the other fluid line 30 from the charging plug 14 back to the temperature control device 34.

As a result of the arrangement of the two fluid lines 30 on two sides of the two DC charging lines 18, the temperature of the two DC charging lines 18 can be efficiently controlled by means of the two fluid lines 30. The fluid in the two fluid lines 30 can contribute to controlling the temperature of the charging cable 12 and, in particular, of the two DC charging lines 18. In particular, as a result of this arrangement of the charging cable sheaths 22, temperature control can be carried out in each case from two sides by means of the two fluid lines 30. This results in a large sectional area with the two DC charging lines 18.

Figure 7:
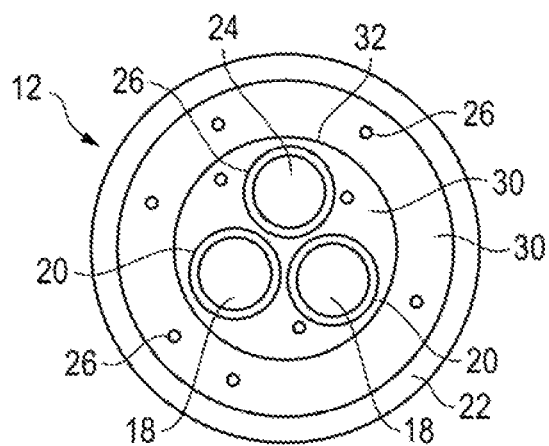
FIG. 7 shows a schematic illustration of a charging cable of the charging cable device from FIG. 3 according to a third embodiment, wherein two fluid ducts are arranged concentrically in the sheath of the charging cable, in a sectional view.

A charging cable 12 according to a third embodiment is illustrated in detail in FIG. 7. The charging cable 12 according to the third embodiment corresponds partially to the charging cable 12 according to the second embodiment, and therefore essentially differences from the charging cable 12 according to the second embodiment are described below.

The charging cable 12 according to the third embodiment comprises two DC charging lines 18 with corresponding insulations 20 which are arranged in a charging cable sheath 22. The DC charging lines 18 are, arranged there together with a ground conductor 24 which is surrounded by a corresponding ground insulation 26.

The charging cable 12 comprises, distributed over the cross section of the charging cable sheath 22, a multiplicity of signal conductors 28 with which the vehicle can communicate with the fast charging station 10.

Moreover, two fluid lines 30, in which a fluid can circulate, are formed in the charging cable sheath 22. The two fluid lines 30 are arranged concentrically within the charging cable sheath 22 and separated from one another by a separating wall 32. Both the two DC charging lines 18 and the ground conductor 24 are positioned here in a central region of the charging cable 12 within the same fluid line 30.

Also according to the third embodiment, the two fluid lines 30 are connected to the temperature control device 34 at an end facing said temperature control device 34, and the two fluid lines 30 are connected to one another at an end of the charging cable 12 facing the charging plug 14.

Figure 8:
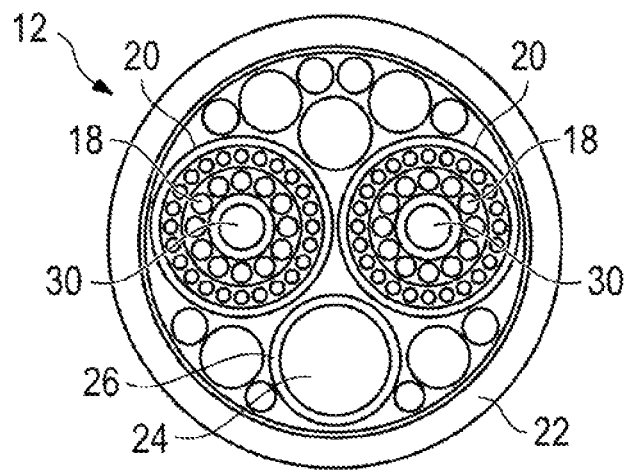
FIG. 8 shows a schematic illustration of a charging cable of the charging cable device from FIG. 3 according to a fourth embodiment, wherein two fluid ducts are arranged in two charging lines of the charging cable, in a sectional view.
Figure 9:
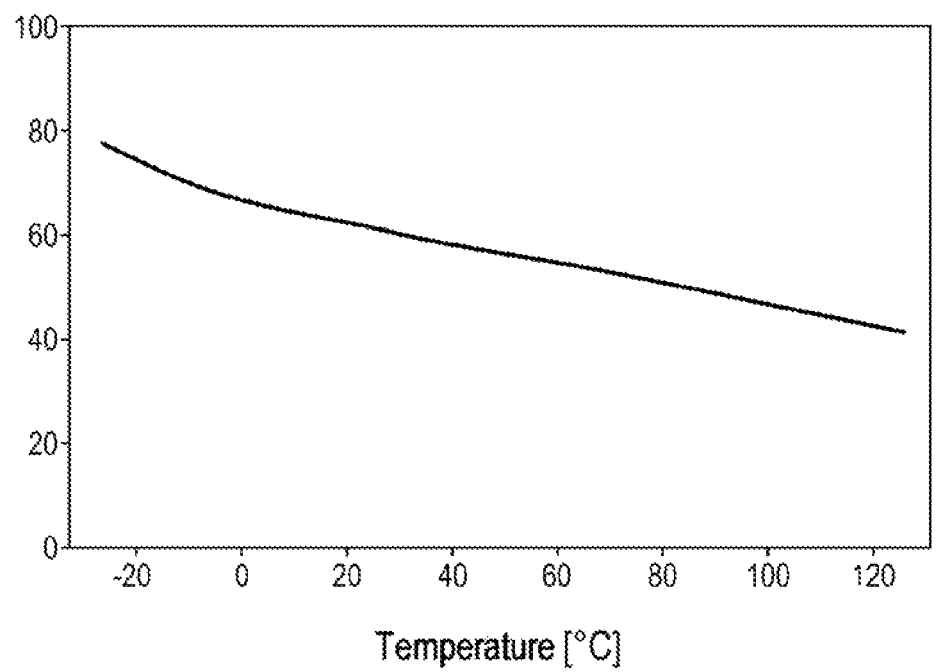
FIG. 9 shows an exemplary diagram of a profile of a Shore hardness plotted against the temperature.

A charging cable 12 according to a fourth embodiment is illustrated in detail in FIG. 8. The charging cable 12 according to the fourth embodiment corresponds partially to the charging cable 12 according to the second embodiment, and therefore mainly differences from the charging cable 12 according to the second embodiment are described below.

The charging cable 12 according to the fourth embodiment comprises two DC charging lines 18 with corresponding insulations 20 which are arranged in a charging cable sheath 22. The DC charging lines 18 are arranged there together with a ground conductor 24 which is surrounded by a corresponding ground insulation 26.

The charging cable 12 illustrated in FIG. 8 also comprises a multiplicity of signal conductors 28 with which the vehicle can communicate with the fast charging station 10. However, these signal conductors are not illustrated in FIG. 8, but can be arranged as described with respect to the charging cables 12 according to the second and third embodiment.

Moreover, two fluid lines 30, in which a fluid can circulate, are constructed within the charging cable sheath 22. The two fluid lines 30 are each constructed concentrically Within the two DC charging lines 18. Also according to the fourth embodiment, the two fluid lines 30 are connected to the temperature control device 34 at an end facing said temperature control device 34, and the two fluid lines 30 are connected to one another at an end of the charging cable 12 facing the charging plug 14.

In an alternative embodiment, the insulations 20 of the two DC charging lines 18 form a boundary of the two fluid lines 30. The DC charging lines 18 and the fluid lines 30 are therefore arranged together within the insulation 20, and the fluid can flow around the DC charging lines 18.

In a further alternative embodiment, the charging cable has a further, third fluid line 30, and the two fluid lines 30, which are constructed in the two DC charging lines 18, together form a through-flow for the fluid in the direction from the temperature control device 34. The further, third fluid line 30 correspondingly forms a return flow for the fluid. As a result, fluid which is temperature-controlled to the same extent flows through the two DC charging lines 18, in order to control the temperature of the DC charging lines 18 to the same extent.

Figure 4:
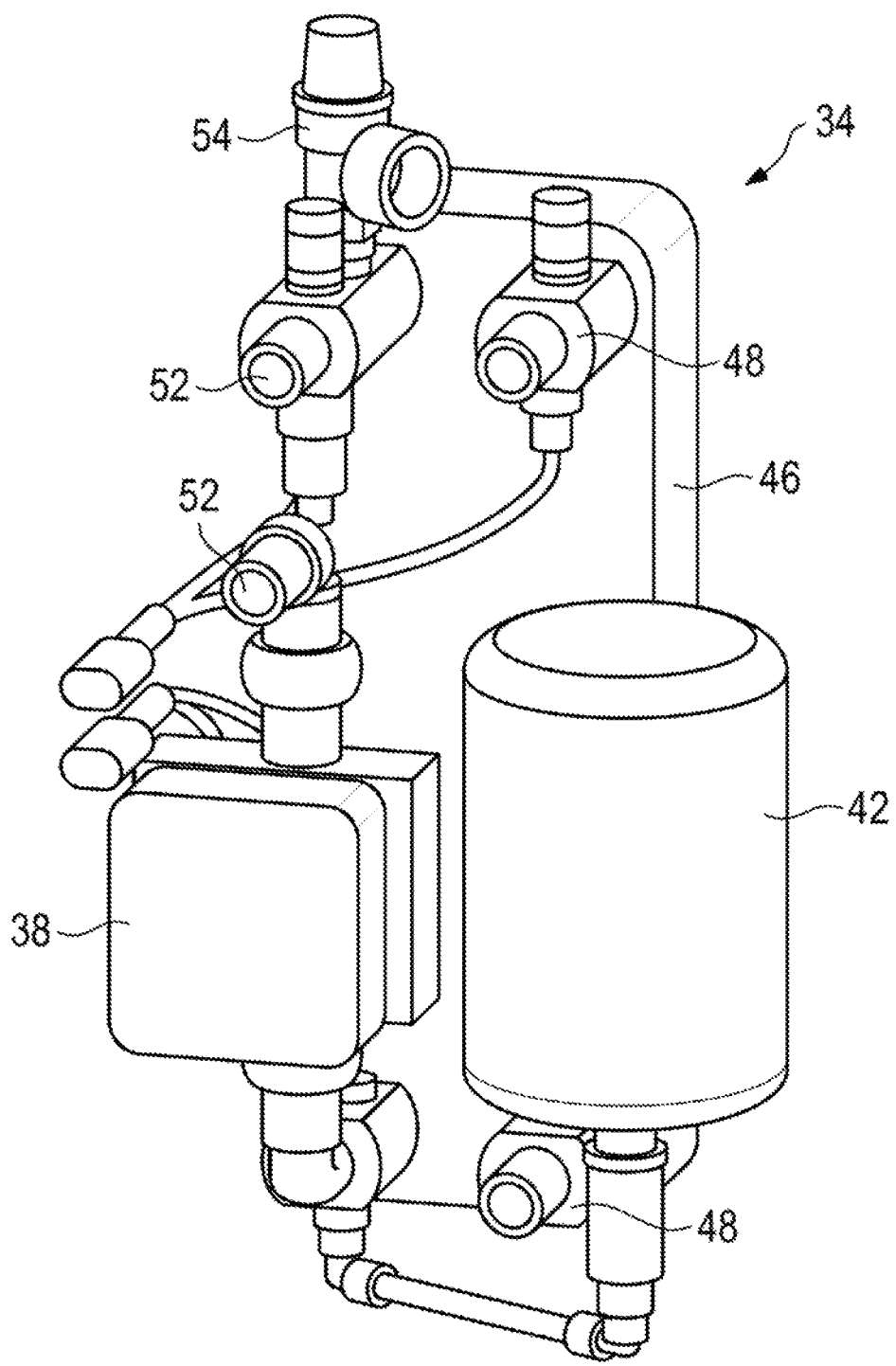
FIG. 4 shows a temperature control device of the charging cable device from FIG. 3 according to the first embodiment, in a perspective view.
Figure 5:
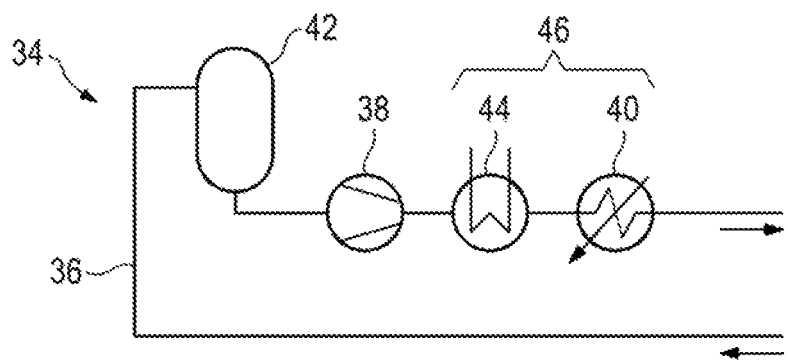
FIG. 5 shows a schematic illustration of the temperature control device of the changing cable device from FIG. 4 according to the first embodiment.

The temperature control device 34 according the first embodiment is illustrated in FIGS. 4 and 5.

The temperature control device 34 comprises a line section 36 which is connected or can be connected to the fluid lines 30 of the charging cable 12 in order to form a dosed fluid circuit.

The temperature control device 34 also comprises a pump 38 which is arranged in the line section 36 in order to circulate the fluid in the fluid circuit. Moreover, the temperature control device 34 comprises a controllable heating device 40 in order to heat the fluid. The heating device 40 is an electric heating device, which is attached to a closed-loop control device in order to carry out heating of the fluid as required. The heating device 40 is arranged in an inflow to the charging cable 12.

Furthermore, the temperature control device 34 comprises an optional compensation container 42 in order to compensate, for example, for fluctuations in volume of the fluid owing to a change in the temperature thereof. Moreover, a loss of fluid can be compensated for, and air pockets in the fluid can be reduced.

The temperature control device 34 additionally comprises a heat exchanger 44, which is also, arranged in the line section 36. The heat exchanger 44 can extract heat from the fluid. As a result, the fluid cannot only be heated by the heating device 40 but also cooled by the heat exchanger 44. In an alternative refinement, the heat exchanger 44 is designed to alternatively or additionally heat the charging cable 12.

The heat exchanger 44 is embodied, together with the heating device 40, as a temperature control unit 46 which integrally comprises both components. Correspondingly, the temperature control unit 46 has two primary circuit connections 48, through which a cooling medium is fed to the heat exchanger 44. Moreover, the temperature control unit 46 comprises two secondary circuit connections 52 via which the temperature control unit 46 is connected to the line section 36.

Furthermore, the temperature control unit 46 is embodied with a venting valve 54, in order to be able to vent the fluid circuit. The venting valve 54 is constructed on one of the secondary circuit connections 52.

The temperature control device 34 also includes two cable lugs 56 for connecting to the DC charging lines 18 of the charging cable 12. The temperature control device 34 also comprises two fluid connection lines 58 with fast couplings 60 for connecting to a primary circuit.

As is apparent from the statements above, the charging cable device 50 is constructed as a closed assembly, which is pre-filled with fluid, for mounting in the fast charging station 10. For this purpose, the charging cable device 50 comprises fast connecting devices 60. This comprises electrical connections and fluid connections, i.e. the fast couplings 60 and electrical connecting lines 68. In this context, the charging cable 12 is secured by the charging cable sheath 22 being secured in a clamping fashion to an outlet of a charging pillar housing 62 of the fast charging station 10.

As is illustrated in FIG. 2, the charging cable device 50 is held in the mounted state in the charging pillar housing 62. For this purpose, the charging pillar housing 62 is embodied with a mounting holder for receiving the temperature control device 34. The charging pillar housing 62 has an upper-side access opening 66 through which the temperature control device 34 can be lowered into the mounting holder.

The described fast charging station 10 according to the first embodiment is designed to carry out a method far controlling the temperature of the charging cable 12 for fast charging the battery of the vehicle. The charging cable 12 is pre-heated here to a temperature which ensures that the charging cable 12 can be heated in good time for subsequent connection to a vehicle to be charged, in order to reduce the rigidity to a desired extent. For this purpose, when not in use the charging cable 12 is pre-heated continuously with a low constant power level.

Before the charging cable 12 is to be connected to the vehicle, the charging cable 12 is heated further. The charging cable 12 is therefore heated in order to reduce its hardness and to make the charging cable 12 more easily bendable. A corresponding diagram of the Shore hardness plotted against the temperature is shown in FIG. 7 for a plastic which is often used. For example, when the charging cable 12 is heated to approximately 40° C. a reduction of the Shore hardness of 10° Shore to 15° Shore can be already achieved compared with a temperature of 0° C.

As soon as the charging cable 12 is connected to the vehicle, the heating of the charging cable 12 is ended. The charging cable 12 is heated at most until the charging cable 12 is connected via its charging plug 14 to a corresponding charging socket (not illustrated in the figures) of the vehicle.

After the connection of the charging cable 12 to the vehicle, the charging cable 12 preferably cooled in order to conduct away waste heat which occurs during the fast charging and to keep the line resistance of the DC charging lines 18 low.

Before the charging cable 12 is disconnected from the vehicle the charging cable 12 is heated again so that the charging cable 12 can easily be disconnected from the vehicle. After the disconnection of the charging cable 12 from the vehicle, the heating of the charging cable 12 is ended.

Figure 10:
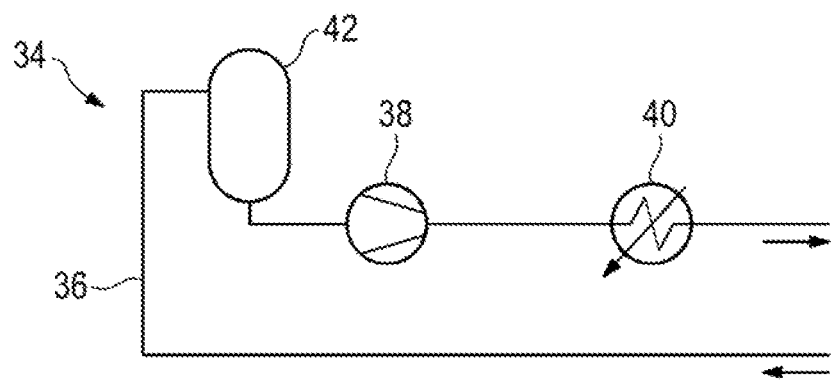
FIG. 10 shows a schematic illustration of a temperature control device according to a fifth embodiment, in a basic view.

Alternatively, the fast charging station 10 according to the first embodiment comprises a temperature control device 34 according to a fifth embodiment which is illustrated in FIG. 10. The temperature control device 34 according to the fifth embodiment corresponds largely to the temperature control device 34 according to the first embodiment, for which reason only differences from the temperature control device 34 according to the first embodiment are described below.

In contrast to the temperature control device 34 according to the first embodiment, the temperature control device 34 according to the fifth embodiment does not comprise a heat exchanger 44. As a result, the temperature of the fluid can only be controlled by the heating device 40, i.e. the fluid can only be heated by the heating device 40. In this exemplary embodiment, the fluid cannot be cooled.

Figure 11:
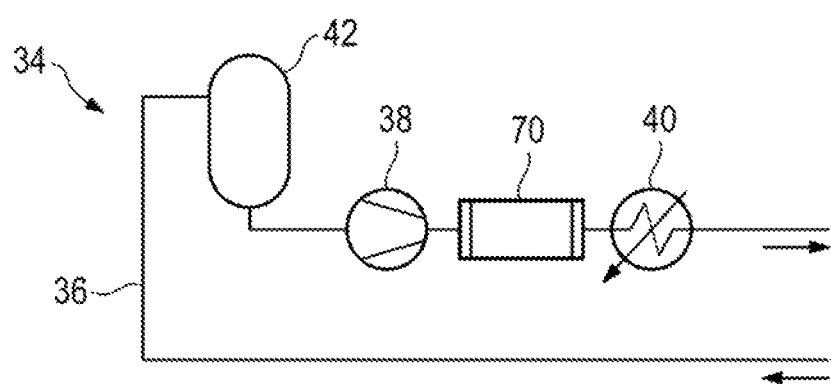
FIG. 11 shows a schematic illustration of a temperature control device according to a sixth embodiment, in a basic view.

As a further alternative, the fast charging station 10 according to the first embodiment comprises a temperature control device 34 according to a sixth embodiment which is illustrated in FIG. 11. The temperature control device 34 according to the sixth embodiment corresponds largely to the temperature control device 34 according to the first embodiment, for which reason only differences from the temperature control device 34 according to the first embodiment are described below.

In contrast to the temperature control device 34 according to the first embodiment, the temperature control device 34 according to the sixth embodiment comprises a cooling device 70 instead of the heat exchanger 44. A primary circuit can be dispensed with, as can corresponding connections for connecting to the primary circuit. For the rest, the statements above apply correspondingly.

Figure 12:
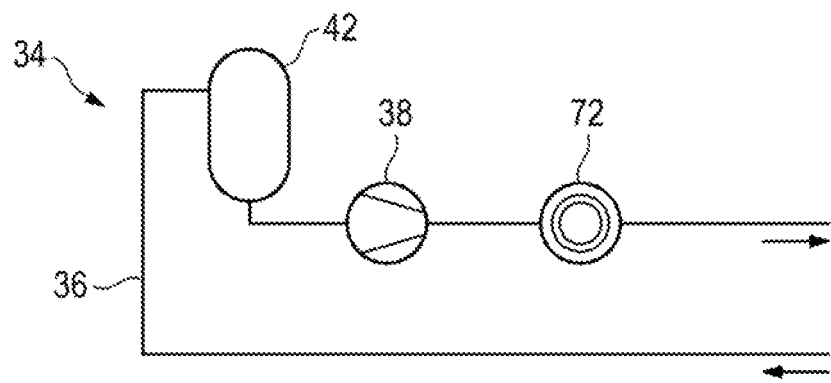
FIG. 12 shows a schematic illustration of a temperature control device according to a seventh embodiment, in a basic view.

As a further alternative, the fast charging station 10 according to the first embodiment comprises a temperature control device 34 according to a seventh embodiment which is illustrated in FIG. 12. The temperature control device 34 according to the seventh embodiment corresponds largely to the temperature control device 34 according to the first embodiment, for which reason only differences from the temperature control device 34 according to the first embodiment are described below.

In contrast to the temperature control device 34 according to the first embodiment, the temperature control device 34 according to the seventh embodiment comprises a heat pump 72 instead of the heat exchanger 44. The heat pump 72 can be operated both for heating and for cooling the fluid here. Correspondingly, the temperature control device 34 according to the seventh embodiment does not comprise a heating device 38 either.

What is claimed is:

1. A charging cable device for a fast charging station for fast charging a battery of a vehicle with an electric drive, said charging cable device comprising:
   a temperature control device, and
   a charging cable connected to the temperature control device, the charging cable having a multiplicity of fluid lines which extend from an end of the charging cable that is connected to the temperature control device to an opposite end of the charging cable having a vehicle charging plug, and the multiplicity of fluid lines are fluidly connected to one another at the opposite end thereby forming a closed loop such that a fluid is transferred at the opposite end of the charging cable directly from one of the multiplicity of fluid lines to another one of the multiplicity of fluid lines at the opposite end, wherein the charging cable device is constructed as a closed assembly, which is pre-filled with the fluid, for mounting in the fast charging station,
   wherein the temperature control device is connected to the fluid lines of the charging cable to form a fluid circuit, and the temperature control device is configured to heat the fluid in the fluid circuit for controlling a temperature of the fluid within the charging cable.

2. The charging cable device as claimed in claim 1, wherein the temperature control device has a heating device that is configured to heat the fluid in the fluid circuit.

3. The charging cable device as claimed in claim 1, wherein the temperature control device has a heat exchanger device that is configured to heat the fluid in the fluid circuit.

4. The charging cable device as claimed in claim 1, wherein the temperature control device has a heat pump device that is configured to heat the fluid in the fluid circuit.

5. The charging cable device as claimed in claim 1, wherein the temperature control device has a cooling device that is configured to cool the fluid in the fluid circuit.

6. The charging cable device as claimed in claim 1, wherein the charging cable device has a pump for circulating the fluid in the fluid circuit, a compensation container for the fluid, or both the pump for circulating the fluid in the fluid circuit and the compensation container for the fluid.

7. The charging cable device as claimed in claim 1, wherein the fluid lines (i) are constructed individually in the charging cable and arranged separately, or (ii) are constructed together and are constructed coaxially with respect to one another, or (iii) are, in each case, constructed and arranged integrally with a charging conductor.

8. The charging cable device as claimed in claim 1, wherein the fluid lines are, in each case, arranged coaxially within a charging conductor.

9. A fast charging station for fast charging the battery of the vehicle with the electric drive, wherein the fast charging station has the charging cable device as claimed in claim 1.

10. The fast charging station as claimed in claim 9, wherein the fast charging station has a charging pillar housing embodied with a mounting holder for receiving the temperature control device,
wherein the charging pillar housing has an upper-side access opening, and the temperature control device is configured to be lowered into the mounting holder through the upper-side access opening.

* * * * *